June 15, 1937.  N. V. SMITH  2,083,875
LUBRICATING DEVICE
Filed Nov. 20, 1934
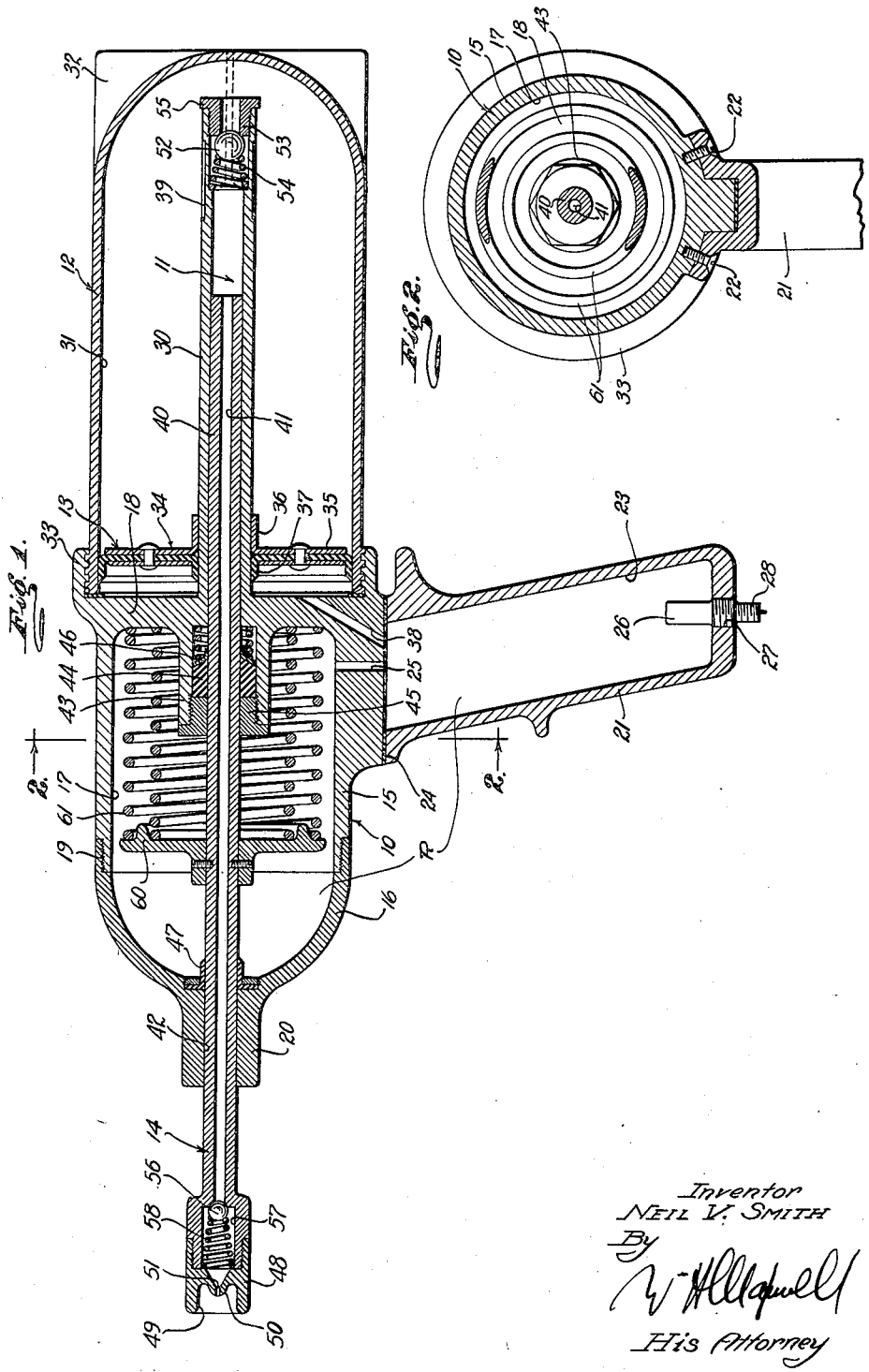
Inventor
NEIL V. SMITH
By
His Attorney Patented June 15, 1937

2,083,875

UNITED STATES PATENT OFFICE 2,083,875

LUBRICATING DEVICE

Neil V. Smith, Los Angeles, Calif., assignor to Smith-Johnson Corporation, Los Angeles, Calif., a corporation of California Application November 20, 1934, Serial No. 753,865

14 Claims. (Cl. 221—47.4)

This invention relates to a lubricating device and relates more particularly to a lubricant gun or grease gun for forcing lubricant to machine parts to lubricate the same. A general object of the invention is to provide a practical, compact, and entirely self-contained manually operable lubricant pump or grease gun.

Another object of the invention is to provide a portable manually operable grease gun that carries its own supply of lubricant in a readily removable and replaceable lubricant cartridge or container whereby the gun may be employed for the handling of lubricants of various grades and characters.

Another object of the invention is to provide a portable manually operable grease gun of the character mentioned whose mechanism is capable of effectively handling the various grades of the lighter or less tenacious greases and lubricants as well as the fibrous greases which the usual grease guns are incapable of handling.

Another object of the invention is to provide a symmetrical and readily manipulated portable grease gun that is actuated to force a charge of lubricant to a machine part by engaging the discharge fitting of the gun against the lubricant receiving fitting on the machine part and then applying an inward force or push to the gun to force the charge of lubricant into the receiving fitting.

Another object of the invention is to provide a portable manually operable grease gun of the character mentioned having a large lubricant capacity and that may be easily and conveniently operated with one hand.

Another object of the invention is to provide a portable manually operated grease gun of the character mentioned that embodies a novel means for storing a supply of air under pressure for feeding lubricant to the high pressure lubricant cylinder.

Another object of the invention is to provide a portable manually operated grease gun in which the body, the removable lubricant container, the lubricant cylinder, and the ejector or plunger have a common longitudinal axis rendering the device sightly, compact, well balanced, and easy to handle and operate.

Another object of the invention is to provide a manually operated grease gun in which a minimum amount of lubricant must be cleared or discharged from the mechanism when it is desired to handle a different grade or class of lubricant.

A further object of the invention is to provide a manually operated grease gun of the character mentioned that embodies a minimum number of simple, sturdy, inexpensive parts.

Other objects and features of the invention may be fully understood from the following detailed description of a typical preferred form and application of the invention throughout which description reference is made to the accompanying drawing, in which:

Fig. 1 is a central longitudinal detailed sectional view of the grease gun illustrating the parts in the normal unactuated positions and Fig. 2 is a transverse detailed sectional view taken as indicated by line 2—2 on Fig. 1.

The lubricating device or grease gun of this invention includes, generally, a body 10 having lubricant chamber or cylinder 11, a removable lubricant cartridge or lubricant container 12 on the body 10, means 13 for feeding charges of lubricant from the container 12 to the cylinder 11, and means 14 for ejecting or forcing the charges of grease from the cylinder 11 to the machine parts to be lubricated.

The body 10 is a hollow or chambered structure that is light in weight and capable of holding or storing a supply of air under pressure.

In the particular form of the invention illustrated in the drawing, the body 10 is sectional, comprising an inner or main section 15 and a head 16. The main body section 15 is preferably cylindrical and has a comparatively large longitudinal chamber 17. A rear end wall or partition 18 closes the rear end of the chamber 17. The head 16 may be threaded to the forward end of the main section 15 at a flush threaded joint 19. The head 16 may be substantially spherically rounded as illustrated in the drawing and may have a central forwardly projecting boss 20 on its forward end. The interior of the head 16 is relieved or recessed and its internal space or opening constitutes a forward portion of the chamber 17.

A handle 21 is provided on the body 10 to facilitate the easy manipulation and actuation of the device. The handle 21 projects laterally or downwardly from the lower side of the main body section 15. The lubricant container 12 projects rearwardly from the body 10 and the handle 21 preferably projects downwardly adjacent the rear end of the body section 15 so that it is located substantially midway between the opposite ends of the assembly to be at or adjacent the center of gravity of the gun. The handle 21 may be secured to the body section 15 by screws 22 and the lower wall of the section 15 may be thickened or flanged to receive the handle. In practice, the handle 21 may incline downwardly and rearwardly so that the device or gun may be easily manipulated and balanced on or by the operator's hand grasping the handle.

In accordance with the invention the handle 21 is hollow having a comparatively large internal space or chamber 23. The chamber 23 extends downwardly from the upper end of the handle and its upper end is closed by the lower wall of the body section 15. Suitable gaskets 24 may be provided to seal between the handle 21 and the lower surface of the body section 15. The chamber 23 in the handle 21 is adapted to contain or hold air under pressure and is connected with the chamber 17 by a port 25 in the wall of the section 15 so that the chamber 23 and the chamber 17 constitute a reservoir R for storing or holding air under pressure. It will be noted that the connected or communicating chambers 17 and 23 in addition to constituting a large air holding reservoir R materially lighten the device so that it is easy to manipulate. Means is provided for passing or delivering air under pressure to the reservoir R. This means comprises a valve 26 extending through an opening 27 in the lower end of the handle 21. The valve 26 may be similar to or identical with the class of valves employed on the inner tubes of pneumatic vehicle tires and may have a threaded portion 28 projecting from the handle 21 to be received by the fitting of the air hoses commonly found in service stations, garages, etc. The valve 26 is in the nature of a check valve which is adapted to admit air under pressure into the reservoir R and that operates to prevent the reverse or outflow of air. The air under pressure stored in the reservoir R actuates the feed means 13.

The cylinder 11 of the body 10 is provided to receive charges of lubricant from the container 12 and constitutes the high pressure lubricant cylinder of the gun. In the preferred form of the invention the cylinder 11 is located to receive the lubricant directly from the container 12. In the form of the invention illustrated in the drawing the chamber or cylinder 11 is in the nature of a longitudinal opening in a part or extension 30 of the body 10 projecting rearwardly from the partition 18. The extension 30 may be integral with the wall or partition 18 and is preferably cylindrical and uniform in diameter.

The lubricant cartridge or container 12 is removably secured to the body 10 to project rearwardly or longitudinally from its rear end. The container 12 is a hollow member having a chamber or opening 31 for carrying a supply of lubricant. The lubricant container 12 may be cylindrical in its general configuration and may have a rounded rear end provided with ribs or feet 32 for supporting it in a vertical position when detached from the body 10. The forward open end of the container 12 is removably secured to the body 10 in a manner so that the container is coaxial with the body. In accordance with the broader principles of the invention the means for connecting the container 12 with the body 10 may be varied considerably in character. In the simple, preferred embodiment illustrated in the drawing an annular member or flange 33 projects from the rear end of the body section 15 and the forward end of the container 12 is threaded into the flange. The lubricant container 12 encloses the body extension 30 and is proportioned so that the rear end of the extension is adjacent its rear end wall. It is believed that it will be apparent how the container 12 may be provided with a supply of lubricant and secured to the rear end of the body 10 to directly supply the lubricant to the cylinder 11. A suitable or desired number of containers 12 may be supplied with the gun for holding lubricants of various grades so that the gun may be quickly provided with supplies of various grades of lubricants.

The means 13 for feeding the lubricant from the container 12 to the cylinder 11 is adapted to be actuated by air under pressure from the reservoir R when the gun is handling heavy or medium heavy grades of lubricant and is adapted to be actuated by atmospheric pressure when the gun is handling lighter lubricants. The feed means 13 comprises a follower or piston 34 shiftable longitudinally on the extension 30 within the container opening 31. The piston 34 includes a plate-like body 35 having a tubular flange or sleeve 36 slidable on the body extension 30. A cup leather or sealing element 37 is carried by the piston body 35 to slidably seal with the wall of the opening 31 and the external surface of the extension 30. Air pressure is supplied or delivered from the reservoir R to the forward end of the container opening 31 by a port 38 in the body section 15. The port 38 may extend through the partition 18 to put the forward end of the container opening 31 in communication with the air holding chamber 23 of the handle 21. As long as pressure remains in the reservoir R it is exerted on the piston 34 to force charges of lubricant from the container 12 into the cylinder 11. When the gun is to handle heavy or comparatively heavy lubricants air under suitable pressure may be passed into the reservoir R through the valve 26 to act rearwardly on the piston 34. The reservoir R has a sufficient capacity to hold a supply of air under pressure to feed the entire or substantially the entire contents of the container 12 into the cylinder 11 upon successive actuation of the gun.

When the lighter grades of lubricant are to be used in the gun, the valve 26 or the core of the valve 26 may be removed to admit atmospheric pressure to the reservoir R and inner end of the container 12 to act on the piston 34. Under such conditions of operation the atmospheric pressure acting on the piston 34 is effective in feeding lubricant to the cylinder 11. Means may be provided for by-passing the actuating pressure past the piston 34 upon the piston reaching a position adjacent the rear end or wall of the container 12. Grooves or slots 39 are provided in the rear end portion of the extension. When the piston 34 reaches a position where its sealing element 37 surrounds the portion of the extension having the slots 39, the actuating air pressure is free to pass through the slots 39 and into the rear portion of the container and the rearward travel of the piston ceases.

The means 14 is manually operable by force applied to the body 10, preferably through the medium of the handle 11, to eject or force charges of lubricant from the cylinder 11 to the machine parts or unit to be lubricated. The ejecting means 14 includes an ejector or plunger 40 adapted to displace lubricant from the chamber 11 and to conduct it to the lubricant receiving fitting of the part being lubricated. The plunger 40 is slidable or shiftable longitudinally in the cylinder 11 and is tubular having a longitudinal opening 41 extending through it from one end to the other. The opening 41 may be comparatively small with respect to the diameter of the plunger. The plunger 40 extends forwardly from the cylinder 11 through the chamber 17 and passes through a longitudinal opening 42 in the boss 20 to project from the forward end of the gun. A boss 43 projects forwardly from the partition 18 and carries packing 44 for sealing about the plunger 40. The packing 44 is compressed between a follower 45 and a spring pressed washer 46. A cup leather or sealing means 47 may be provided at the inner end of the opening 42 for sealing about the plunger 40.

A means or fitting is provided on the forward projecting end of the plunger 40 to cooperate with the lubricant receiving fitting of the machine parts to be lubricated. In practice, any suitable type of fitting may be provided on the plunger 40 to adapt the device for forcing lubricant through lubricant receiving fittings of various types. In the particular case illustrated in the drawing the forward end portion of the plunger 40 is enlarged and a fitting 48 is screw-threaded to this enlarged portion. The fitting 48 has a socket 49 in its outer end adapted to receive the lubricant or grease gun fitting of the machine part being lubricated. A central rounded protuberance or projection 50 is provided on the bottom of the socket 49. A central perforation or opening 51 extends through the projection 50 to pass lubricant outwardly from the plunger opening 41 to the lubricant receiving fitting.

Valve means is provided for governing the admission and discharge of lubricant to and from the cylinder 11 and the communicating opening 41 of the plunger. An inlet valve 52 is provided to control the admission of lubricant to the rear end of the cylinder 11. The valve 52 may be in the nature of a ball valve adapted to seat rearwardly against a seat 53 removably threaded in the rear end of the extension 30. A spring 54 urges the valve 52 against its seat 53. The seat 53 may have a projecting flange 55 whereby it may be conveniently engaged for removal, etc. when the lubricant container 12 is detached from the body 10. A valve 56 for controlling the discharge of lubricant from the gun is arranged in a socket or enlargement 57 in the enlarged forward end portion of the plunger. The valve 56 may be in the form of a ball valve for cooperating with a suitable seat at the mouth of the opening 41. A spring 58 is arranged under compression between the valve 56 and the fitting 48 to urge the valve 56 into cooperation with its seat. The spring 58 is sufficiently strong to normally hold the valve 15 closed against the action of the air pressure acting on the piston 34 and to prevent the lubricant from bleeding from the gun when the fitting 48 is disconnected from the lubricant receiving fitting.

To operate the device or gun to force a charge of lubricant into a lubricant receiving fitting on a machine part, the fitting 48 is engaged against the lubricant receiving fitting so that the opening 51 may discharge the lubricant into the receiving fitting. An inward force or push is then applied to the body 10 by engaging and acting on the handle 21 or any other suitable part of the body 10 or container 12. This inward push moves the body 10 and the associated parts relative to the plunger 40 which is held stationary through the engagement of the fitting 48 with the lubricant receiving fitting. As the body extension 30 moves inwardly or forwardly relative to the plunger 40 the charge of lubricant in the rear portion of the cylinder 11 is ejected or displaced forwardly through the opening 41 to unseat the valve 56 and pass through the opening 51 into the lubricant receiving fitting.

The invention includes means for returning the parts to their normal positions after the ejection or forcing of the charge of lubricant into the lubricant receiving fitting. This means may include an abutment or plate 60 attached to the plunger 40 within the chamber 17. The plate 60 is spaced a considerable distance forwardly from the partition 18 when the parts are in their normal positions. One or more springs 61 are arranged under compression between the plate 60 and the forward face of the partition 18. In the case illustrated in the drawing there are two spiral springs 61 arranged one within the other and held under compression between the plate 60 and the partition 18. The springs 61 return or aid the return of the body 10 to its normal position relative to the plunger 40 following the ejection of a charge of lubricant.

It is believed that the operation of the lubricating device or grease gun of this invention will be readily understood from the foregoing detailed description. A container 12 holding a supply of the desired or required grade of lubricant may be easily attached to the body 10 by threading its end into the flange 33. Following the attachment of the container 12 to the body 10, air under pressure may be supplied to the reservoir R through the valve 26. The pressure on the air in the reservoir R is transmitted to the lubricant in the container 12 by the piston 34. To actuate the gun, the fitting 48 is arranged against the lubricant receiving fitting of the machine unit to be lubricated so that the opening 51 is positioned to discharge lubricant into the receiving fitting. The body 10 is then pushed or moved forwardly against the action of the springs 61. During this movement the plunger 40 remains stationary due to the engagement of the fitting 48 with the lubricant receiving fitting. As the body moves forwardly relative to the plunger 40 the lubricant in the rear portion of the cylinder 11 is displaced and is forced forwardly through the opening 41 past the valve 56 and into the lubricant receiving fitting of the machine unit. The valve 52, of course, remains closed during the ejection of the lubricant.

Following the ejection of the charge of lubricant from the gun the operator may leave the fitting 48 in engagement with the lubricant receiving fitting and may relieve the inward force he has exerted on the body 10 so that the springs 61 automatically move the body outwardly or rearwardly relative to the plunger 40. This same relative movement between the body 10 and plunger 40 occurs if the operator disengages the fitting 48 from the lubricant receiving fitting except that in this case the plunger 40 is moved by the springs 61. During the return of the body 10 and plunger 40 to their normal relative positions illustrated in Fig. 1 of the drawing, the air under pressure acting against the forward side of the piston 34 forces lubricant from the container 12 into the cylinder 11. The device or gun is then conditioned for another actuation.

The present invention provides a portable manually operated grease gun that is very compact and light in weight and that is capable of handling various classes of lubricants. The device involves only two valves governing the movement of the lubricant which valves are formed and positioned so that they may properly operate when the device is handling various types of lubricant.

The body 10, the cylinder 11, and the container 12 in being coaxial provide a very compact and well balanced structure. The device may be easily operated with only one hand. The operator may grasp the handle 21 with one hand for the full handling and operating of the gun. The gun is entirely self-contained as it holds its own supply of lubricant and its own supply of air under pressure for feeding lubricant to the high pressure lubricant cylinder 11.

Having described only typical forms and applications of my invention I do not wish to be limited or restricted to the specific forms and applications herein set forth, but wish to reserve to myself any modifications or variations that may appear to those skilled in the art or fall within the scope of the following claims.

Having described my invention, I claim:

1. A grease gun including, a body having a lubricant cylinder, there being a chamber in the body forming a reservoir for holding air under pressure, a lubricant container attached to the body, means actuated by air under pressure from the reservoir for forcing a charge of lubricant from the container into the cylinder, and a plunger operable in the cylinder and projecting from the body for engaging the part to be lubricated, the body and plunger being related for relative longitudinal movement.

2. A grease gun including, a body having a lubricant cylinder, there being an opening in the body forming a reservoir for holding air under pressure, a lubricant container on the body at the rear of the reservoir, means actuated by air under pressure from the reservoir for forcing a charge of lubricant from the container into the cylinder, and a tubular plunger shiftable in the cylinder and projecting from the body for engaging the part to be lubricated.

3. A lubricating device including, a body having a cylinder for receiving a charge of lubricant, a removable lubricant container on the rear end of the body, there being a chamber in the body in front of the container forming a reservoir for carrying fluid under pressure and a port in the body establishing communication between the chamber and the container whereby the fluid under pressure feeds lubricant from the container into the cylinder, and means for ejecting lubricant from the cylinder to the part to be lubricated.

4. In a portable manually operated lubricant gun, lubricant feeding means, ejecting means related to the feeding means to receive lubricant therefrom, a body carrying the feeding means and the ejecting means, and a handle projecting laterally from the body, the body and handle having communicating chambers forming a reservoir for holding air under pressure, said reservoir communicating with the said feeding means to actuate the same.

5. A lubricating device including, a body having a handle, there being a chamber in the body forming a reservoir for air under pressure, normally closed valve means on the handle for admitting air under pressure to the chamber, means for removably securing a lubricant container to the body to be in communication with the said reservoir, a cylinder on the body for holding a charge of lubricant and related to the container to receive a charge of lubricant therefrom, means actuated by said air under pressure from the reservoir for forcing a charge of lubricant from the container into the cylinder, and means for ejecting the charge of lubricant from the cylinder to the part to be lubricated.

6. A lubricating gun including, a body having a rearwardly extending cylinder for receiving a charge of lubricant, a lubricant container attached to the body to enclose the cylinder, there being a chamber in the body carrying air under super-atmospheric pressure and communicating with the container whereby the air under pressure forces lubricant into the cylinder, and a tubular plunger extending forwardly from the body to cooperate with the part to be lubricated and entering the cylinder to force the charge to said part upon relative movement between the body and plunger.

7. A lubricating gun including, a body having a rearwardly extending cylinder for receiving a charge of lubricant, there being a chamber in the body for holding fluid under pressure, a lubricant container attached to the body to enclose the cylinder and supply lubricant thereto and having communication with the chamber whereby said fluid under pressure forces lubricant into the cylinder, the body chamber, cylinder and container being co-axial, and a tubular plunger extending forwardly from the body to cooperate with the part to be lubricated and entering the cylinder to force the charge to said part upon relative movement between the body and plunger.

8. A lubricating gun including, a body having a rearwardly extending cylinder for receiving a charge of lubricant, there being a chamber in the body forming a reservoir for fluid under pressure, a lubricant container attached to the body to enclose the cylinder and supply lubricant thereto, means actuated by fluid under pressure from the reservoir for feeding lubricant from the container into the cylinder, and a tubular plunger extending forwardly from the body to cooperate with the part to be lubricated and entering the cylinder to force the charge to said part upon relative movement between the body and plunger.

9. A lubricant gun including, a body having a rearwardly extending cylinder for receiving a charge of lubricant, a lubricant container attached to the body to enclose the cylinder and supply lubricant thereto, fluid pressure means for feeding lubricant from the container into the cylinder, there being a chamber in the body forming a reservoir for holding fluid pressure to actuate said means, and a tubular plunger extending forwardly from the body to cooperate with the part to be lubricated and entering the cylinder to force the charge to said part upon relative movement between the body and plunger.

10. A manual lubricating device for supplying lubricant under pressure to a fitting on a part to be lubricated including a body having a hollow chamber portion and having an extension provided with a cylinder, a removable lubricant container on the body, a laterally projecting handle on the body, the handle being hollow and in communication with the hollow chamber portion whereby the chamber and handle form a reservoir for air under pressure, the said reservoir having communication with the container, a piston shiftable on the extension in the container by the air under pressure to feed lubricant to the cylinder, and a tubular plunger projecting from the body to engage the fitting of the part to be lubricated and entering the cylinder to force lubricant to said part.

11. A portable lubricant gun including a body having a reservoir, a cylinder projecting rearwardly from the body, a lubricant cartridge removably secured to the body to project rearwardly therefrom, means for providing fluid under pressure in the reservoir, means actuated by said fluid under pressure for feeding lubricant from the cartridge into the cylinder, a tubular plunger extending forwardly from the body to cooperate with the part to be lubricated and entering the cylinder to force lubricant therefrom to the said part upon relative movement between the body and plunger and means for returning the body and plunger to their normal relative positions.

12. A manual grease gun including a body having a cylinder, a removable lubricant container projecting rearwardly from the body, fluid pressure means for feeding lubricant from the container to the cylinder, a plunger projecting from the body to cooperate with the part to be lubricated and entering the cylinder to eject lubricant to said part, and a laterally projecting handle adjacent the center of gravity of the assembly of the body and lubricant container whereby the gun is readily operatable with one hand.

13. In a portable lubricating gun, a body, lubricant feeding means carried by the body, lubricant ejecting means receiving lubricant from the feeding means, a laterally projecting handle on the body, the body and handle having communicating chambers forming a reservoir for holding fluid under pressure, the chambers having communication with the lubricant feeding means to actuate said feeding means, and a fitting for admitting fluid under pressure to the reservoir.

14. In a portable lubricating gun, a body, lubricant feeding means carried by the body, lubricant ejecting means receiving lubricant from the feeding means, a laterally projecting handle on the body, the handle having a reservoir for holding fluid under pressure to actuate said feeding means, and a normally closed valve fitting on the handle for admitting fluid under pressure to the reservoir.

NEIL V. SMITH.